(12) United States Patent
Wu

(10) Patent No.: US 9,279,486 B2
(45) Date of Patent: Mar. 8, 2016

(54) SWING DRIVE MECHANISM

(71) Applicant: Zhongshan City Intron Electronics Technology Co., Ltd., Zhongshan (CN)

(72) Inventor: Shupeng Wu, Zhongshan (CN)

(73) Assignee: Shupeng WU, Zhongshan (CN)

( * ) Notice: Subject to any disclaimer, the term of this patent is extended or adjusted under 35 U.S.C. 154(b) by 530 days.

(21) Appl. No.: 13/844,848

(22) Filed: Mar. 16, 2013

(65) Prior Publication Data

US 2013/0213159 A1 Aug. 22, 2013

Related U.S. Application Data

(63) Continuation-in-part of application No. PCT/CN2012/071240, filed on Feb. 17, 2012.

(30) Foreign Application Priority Data

Oct. 31, 2011 (CN) .......................... 2011 1 0337728

(51) Int. Cl.
  *F16H 19/08* (2006.01)
  *A47D 9/04* (2006.01)

(52) U.S. Cl.
  CPC ...... *F16H 19/08* (2013.01); *A47D 9/04* (2013.01); *Y10T 74/18056* (2015.01); *Y10T 74/18088* (2015.01)

(58) Field of Classification Search
  CPC .... F16H 19/08; A47D 9/04; Y10T 74/18056; Y10T 74/18088
  See application file for complete search history.

(56) References Cited

U.S. PATENT DOCUMENTS

| | | | | |
|---|---|---|---|---|
| 5,825,663 A * | 10/1998 | Barba | ..................... | B06B 1/166 702/41 |
| 6,345,546 B1 * | 2/2002 | Houze | ..................... | B06B 1/166 173/27 |
| 7,554,237 B2 * | 6/2009 | Clary | ..................... | B06B 1/166 244/165 |
| 8,083,601 B2 * | 12/2011 | Speedie | ................... | A47D 9/02 472/119 |
| 8,920,332 B2 * | 12/2014 | Hong | ................. | A61B 5/02427 600/309 |
| 2012/0119549 A1 * | 5/2012 | Speedie | ................... | A47D 9/02 297/217.4 |
| 2014/0260723 A1 * | 9/2014 | Ely | .......................... | B06B 3/00 74/87 |

* cited by examiner

*Primary Examiner* — David M Fenstermacher
(74) *Attorney, Agent, or Firm* — Matthias Scholl, PC; Matthias Scholl

(57) ABSTRACT

A swing drive mechanism, including: a vibrating mechanism, a motor driving the vibrating mechanism, and a transmission mechanism. The transmission mechanism is connected between the vibrating mechanism and the motor. The vibrating mechanism is provided with a grating and a photocoupler that detects the position of the vibrating mechanism. The photocoupler is electrically or electronically connected to a micro-control processor. The micro-control processor controls the photocoupler to detect the grating and adjusts the rotation speed of the motor. The micro-control processor is electrically or electronically connected to an accelerometer.

9 Claims, 12 Drawing Sheets

SWING DRIVE MECHANISM

CROSS-REFERENCE TO RELATED APPLICATIONS

This application is a continuation-in-part of International Patent Application No. PCT/CN2012/071240 with an international filing date of Feb. 17, 2012, designating the United States, now pending, and further claims priority benefits to Chinese Patent Application No. 201110337728.X filed Oct. 31, 2011. The contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Filed of the Invention

The invention relates to a swing drive mechanism, and more particularly to a swing drive mechanism for electric cradles.

2. Description of the Related Art

When a cradle having a pendulum is in use, the pendulum of the cradle is required to swing stably without wobbling.

Currently, most of swing drive mechanisms for electrical baby cradles are driven by an electromagnet attracting a heavy block, that is, the swing drive mechanisms are driven by a counterforce. During the driving process, the energy output is finished at the moment the electromagnet attracts the heavy block. The force cannot be increased gradually, thereby resulting in an instantaneously irregular wobbling, irregular swing amplitude, and unstable feeling for infants. Furthermore, by the driving mode, the natural frequency of the baby cradles cannot be detected, and thus a resonance between the external force frequency and the natural frequency cannot be formed. Thus, the driving by the electromagnet attracting heavy block has high energy consumption, small and irregular swing amplitude, high production and material costs.

SUMMARY OF THE INVENTION

In view of the above-described problems, it is one objective of the invention to provide a swing drive mechanism that has a simple structure, and can detect the natural frequency of the cradles to produce resonance, thereby achieving stable swing amplitude and an energy-saving state.

To achieve the above objective, in accordance with one embodiment of the invention, there is provided a swing drive mechanism, comprising: a vibrating mechanism; a motor driving the vibrating mechanism; and a transmission mechanism. The transmission mechanism is connected between the vibrating mechanism and the motor. The vibrating mechanism is provided with a grating and a photocoupler that detect a position of the vibrating mechanism. The photocoupler is in electric connection with a micro-control processor. The micro-control processor controls the photocoupler to detect the grating and adjust the rotation speed of the motor. The micro-control processor is in electric connection with an accelerometer to detect the acceleration of a pendulum.

In a class of this embodiment, the vibrating mechanism comprises a shell body comprising a cavity. The cavity comprises a central axis which is sleeved with a hollow rotating shaft rotating around the central axis. Two ends of the hollow rotating shaft are connected with turnplates rotating with the hollow rotating shaft, respectively. Each turnplate is provided with an eccentric cavity comprising an eccentric heavy block, which is deviated from the rotating shaft. The hollow rotating shaft is provided with a driving medium connected with the transmission mechanism and driving the hollow rotating shaft.

In a class of this embodiment, the transmission mechanism comprises a driving shaft connected with a motor shaft of the motor; the driving medium is a worm gear; the worm gear and the hollow rotating shaft are integrated as a whole; and the driving shaft is provided with a worm matching with the worm gear.

In a class of this embodiment, the shell body comprises a left shell body and a right shell body; a motor cavity for accommodating the motor is arranged in a lower part of the shell body; and the shell body is provided with a locating slot used to fix the photocoupler.

In a class of this embodiment, the locating slot comprises a groove disposed on the left shell body, and a U-shaped slot disposed on the right shell body; and a channel is disposed on the U-shaped slot.

In a class of this embodiment, the hollow rotating shaft is a hexagonal shaft, and the turnplate comprises a hexagonal opening in the center matching with the hexagonal shaft.

In a class of this embodiment, the hollow rotating shaft is a square shaft, and the turnplate comprises a square opening in the center matching with the square shaft.

In a class of this embodiment, the grating is arranged on the turnplate, and the grating crosses the photocoupler when the center of gravity of the eccentric heavy block and the hollow rotating shaft fall on a same horizontal plane.

Advantages of the invention are summarized below:

1) the swing drive mechanism of the invention can detect the natural frequency of cradles and produce a resonance when being used in baby cradles, thereby achieving a stable swing amplitude and an energy-saving state, and making the infants feel comfortable;
2) the swing drive mechanism applies a slow and stable force to the cradle, no wobbling caused; and
3) the swing drive mechanism has a small capacity, simple structure, and low production and material costs.

BRIEF DESCRIPTION OF THE DRAWINGS

The invention is described hereinbelow with reference to accompanying drawings, in which.

DETAILED DESCRIPTION OF THE EMBODIMENTS

Figure 1:
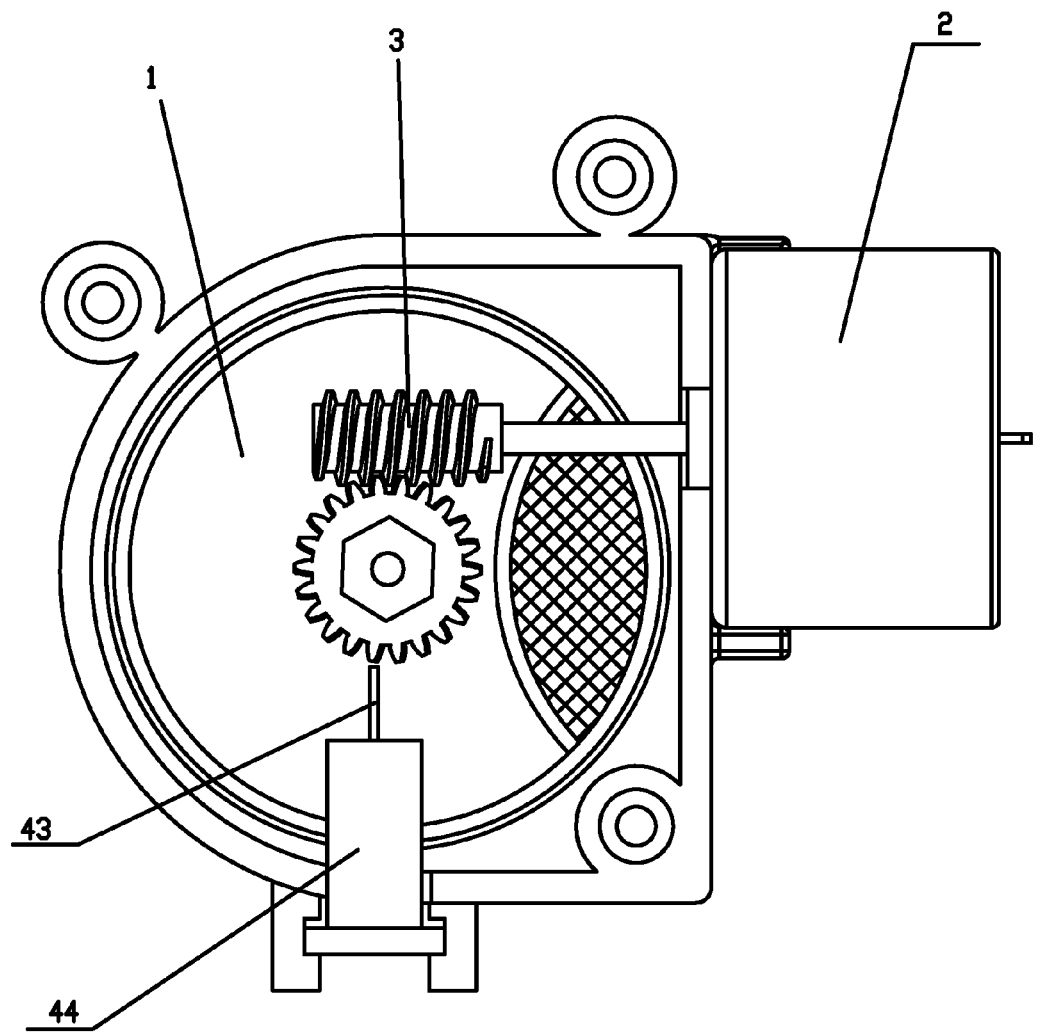
FIG. 1 is a schematic diagram of a swing drive mechanism in accordance with one embodiment of the invention.
Figure 2:
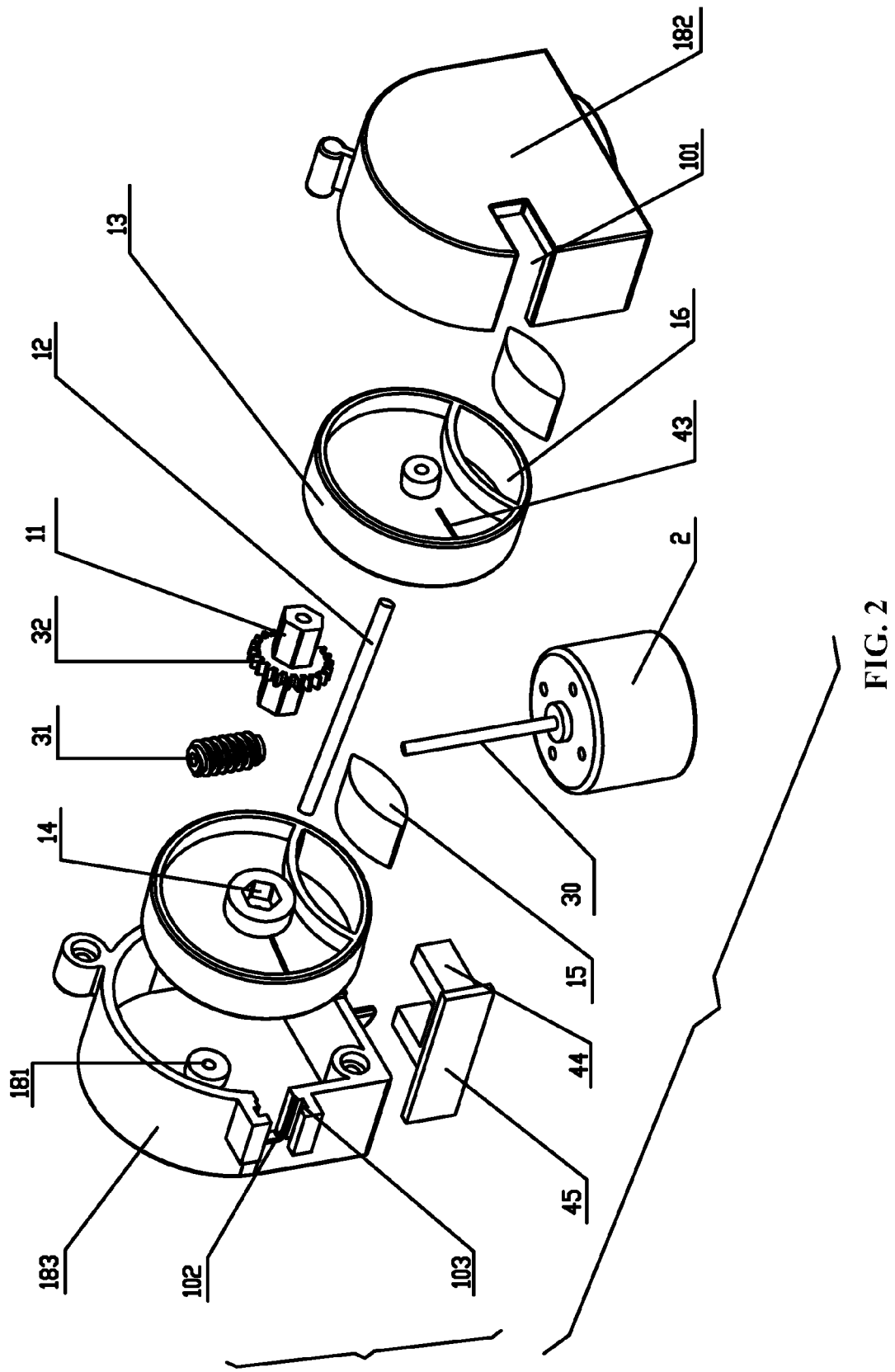
FIG. 2 is an exploded view of a swing drive mechanism in accordance with one embodiment of the invention.

For further illustrating the invention, experiments detailing a swing drive mechanism are described below. It should be noted that the following examples are intended to describe and not to limit the invention.

As shown in FIGS. 1-7, a swing drive mechanism for an electrical cradle, comprises a vibrating mechanism 1 disposed on a pendulum 51 of the electrical cradle 5 and a motor 2 to drive the vibrating mechanism 1. A transmission mechanism 3 is connected between the vibrating mechanism 1 and the motor 2. The vibrating mechanism 3 is provided with a grating 43 and a photocoupler 44 that can detect a position of the vibrating mechanism 1. The photocoupler 44 is in electric connection with a micro-control processor 42. Under the control of the micro-control processor 42, the photocoupler 44 detects the grating 43 and adjusts the rotation speed of the motor 2. The micro-control processor 42 is in electric connection with an accelerometer 41 detecting the acceleration of the pendulum 51.

The vibrating mechanism 1 comprises a shell body 18 connected with the pendulum 51. A cavity 181 provided with a central axis 12 is disposed in the shell body 18. The central axis 12 is sleeved with a hollow rotating shaft 11, and the hollow rotating shaft 11 is relatively rotational to the central axis 12. Two ends of the hollow rotating shaft 11 are connected with turnplates 13 rotating with the hollow rotating shaft 11, respectively. Each turnplate 13 is provided with an eccentric cavity 16 having an eccentric heavy block 15, which is deviated from the rotating shaft. The hollow rotating shaft 11 is inserted into a driving medium 32 that is connected with the transmission mechanism 3 and drives the hollow rotating shaft 11.

Figure 3A:
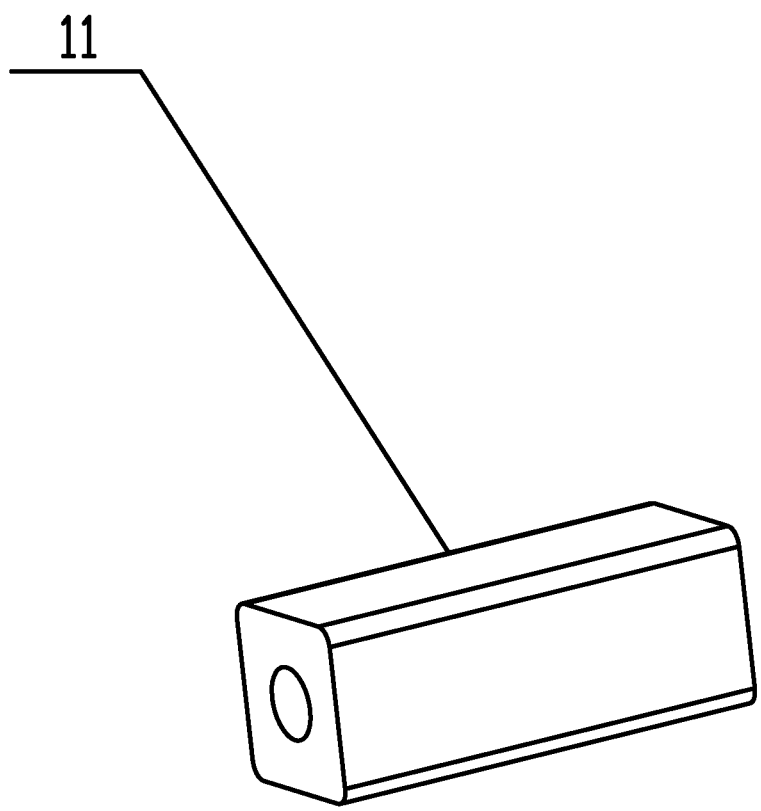
FIGS. 3a-3b are exploded views of a hollow rotating shaft and a driving medium in accordance with one embodiment of the invention.

The hollow rotating shaft 11 is a hexagonal shaft. The turnplate 13 has a hexagonal opening 14 in the center. The hexagonal opening 14 matches with the hexagonal shaft. The hollow rotating shaft 11 can also be in a shape of square, as shown in FIG. 3a, or a pentagon, or other shapes of polygon, and the hexagonal opening 14 can correspondingly be in a shape of square, or a pentagon, or other shapes of polygon.

Figure 3B:
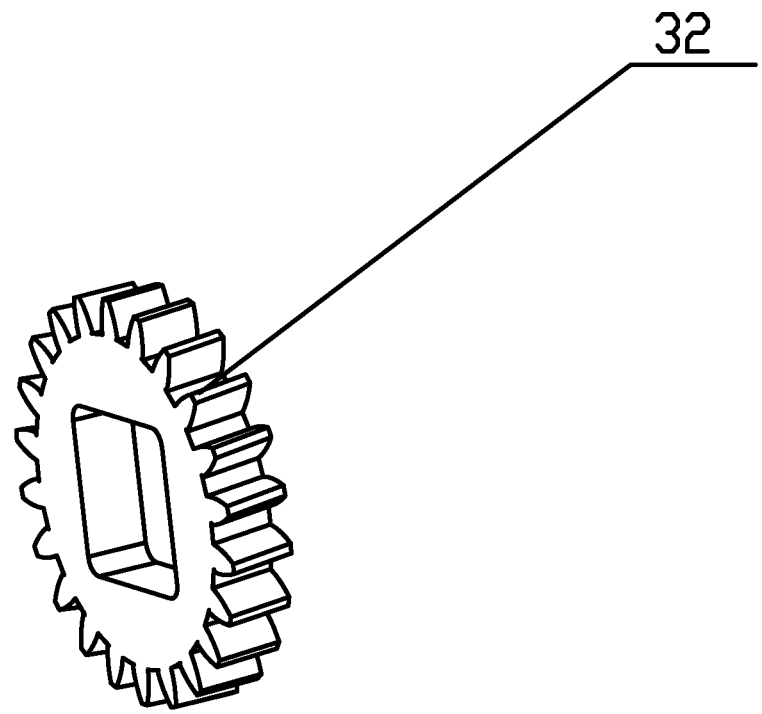
Figure 4:
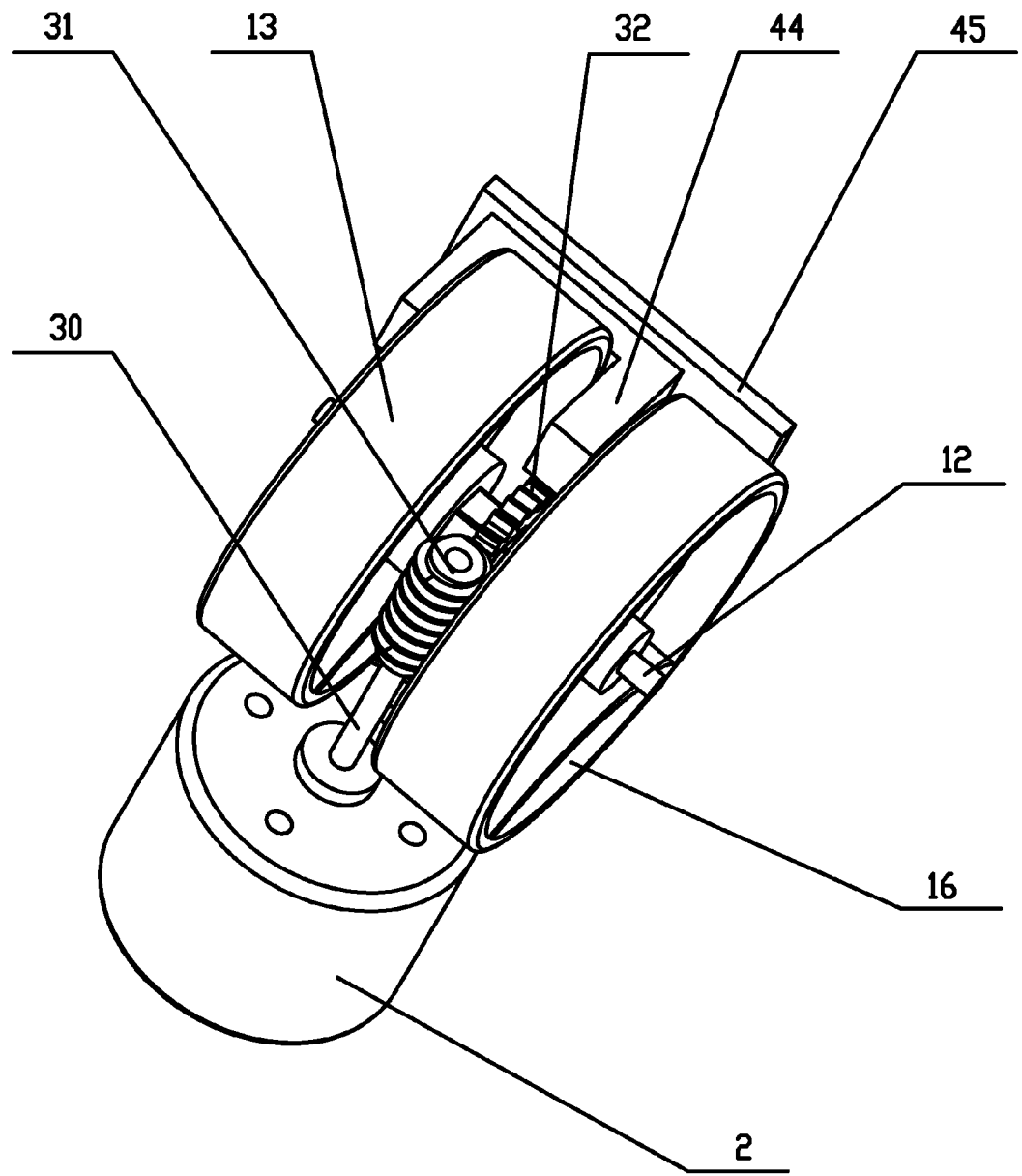
FIG. 4 is a first assembly diagram of a swing drive mechanism in accordance with one embodiment of the invention.
Figure 5:
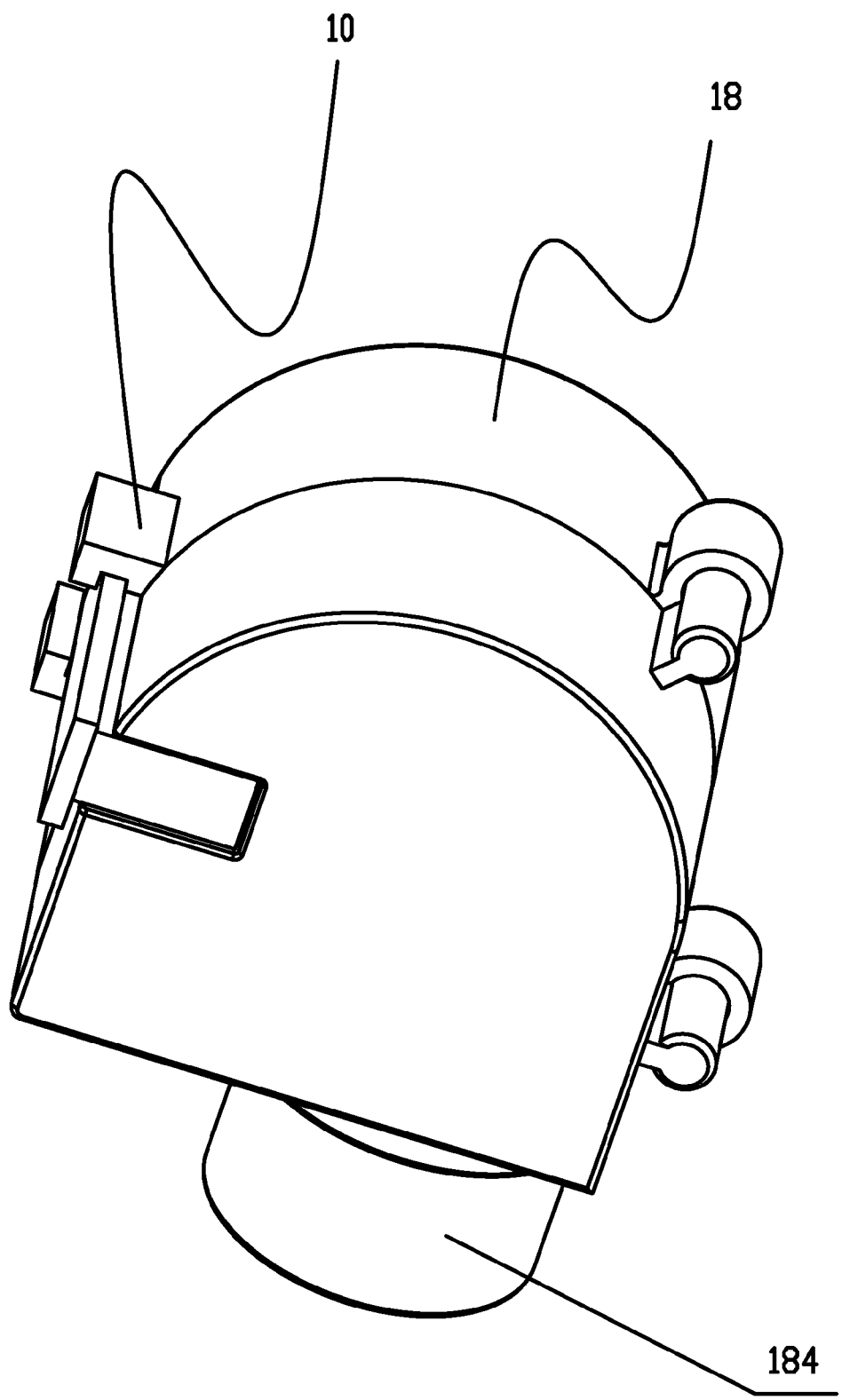
FIG. 5 is a second assembly diagram of a swing drive mechanism in accordance with one embodiment of the invention.

The driving medium 32 is a worm gear. The worm gear and the hollow rotating shaft 11 are integrated as a whole. Optionally, the worm gear and the hollow rotating shaft 11 are separated parts, as shown in FIGS. 3a, 3b.

The transmission mechanism 3 comprises a driving shaft 30 connected with a motor shaft of the motor 2, and the driving shaft 30 is provided with a worm 31 that matches with the worm gear.

The shell body 18 comprises a left shell body 182 and a right shell body 183. A motor cavity 184 accommodating the motor 2 is disposed in a lower part of the shell body 18. The shell body 18 is provided with a locating slot 10 used to fix the photocoupler 44. The locating slot 10 comprises a groove 101 disposed on the left shell body 182 and a U-shaped slot 102 disposed on the right shell body 183. A channel 103 is disposed on the U-shaped slot 102.

The photocoupler 44 is provided with a base 45 that can be inserted into the channel 103. No matter how many the turnplates 13 are, the turnplates have the same rotation speed since they rotate with the hollow rotating shaft 11. Thus, only one photocoupler 44 is required to detect the grating 43 disposed on one turnplate 13. The grating 43 is disposed on the turnplate 13. When a center of gravity of the eccentric heavy block 15 and the hollow rotating shaft 11 fall on the same horizontal plane, the grating 43 crosses the photocoupler 44. The position of the grating 43 can change in accordance with changing positions of the eccentric heavy block 15 and the locating slot 10.

The grating 43 can be directly arranged on the turnplate 13, or be individually arranged and then connected with the turnplate 13 and rotates with the turnplate 13. Under both conditions, the grating 43 crosses the photocoupler 44 when the center of gravity of the eccentric heavy block 15 and the hollow rotating shaft 11 fall on the same horizontal plane.

Figure 6:
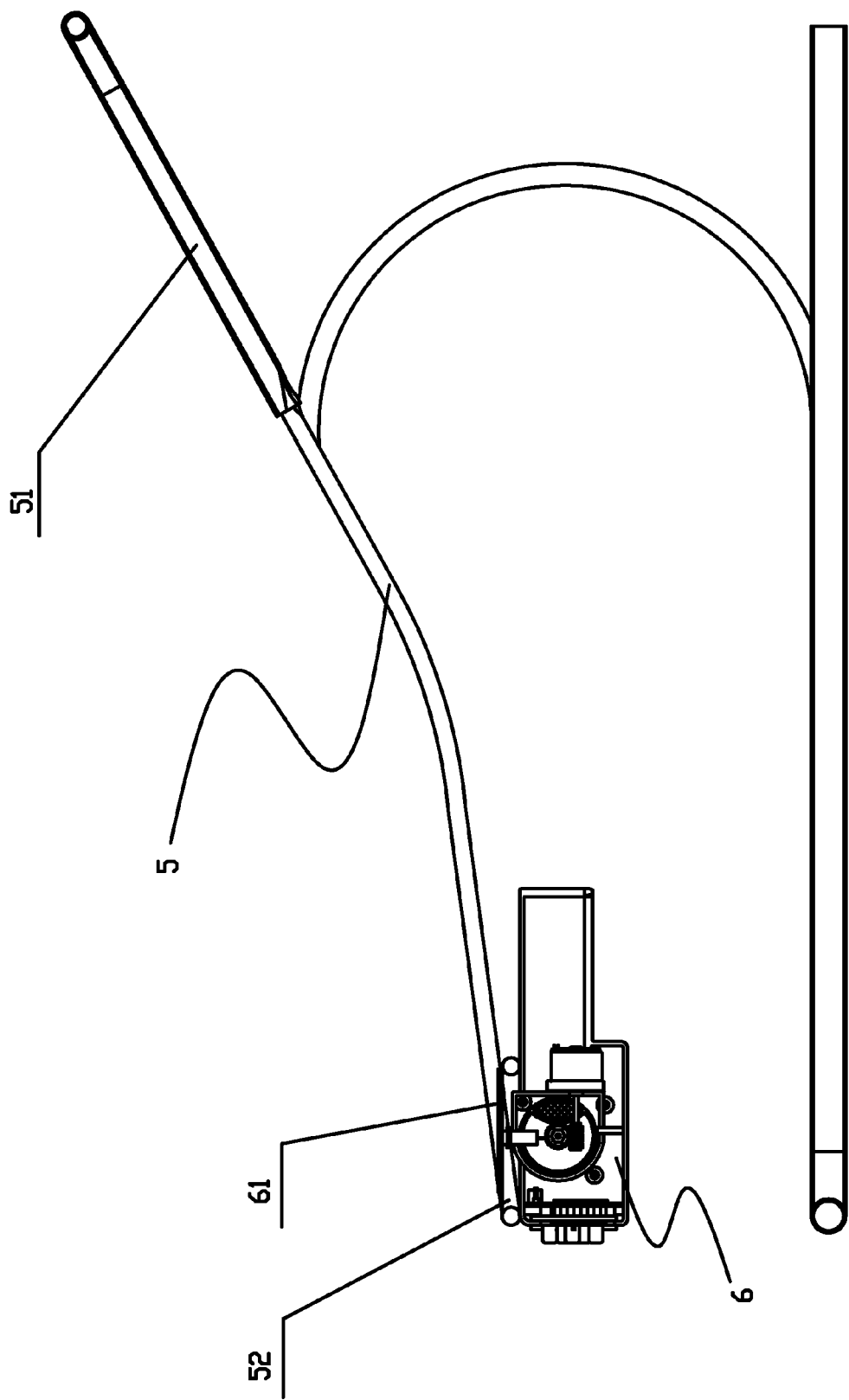
FIG. 6 is a first diagram in use of a swing drive mechanism in accordance with one embodiment of the invention.
Figure 7:
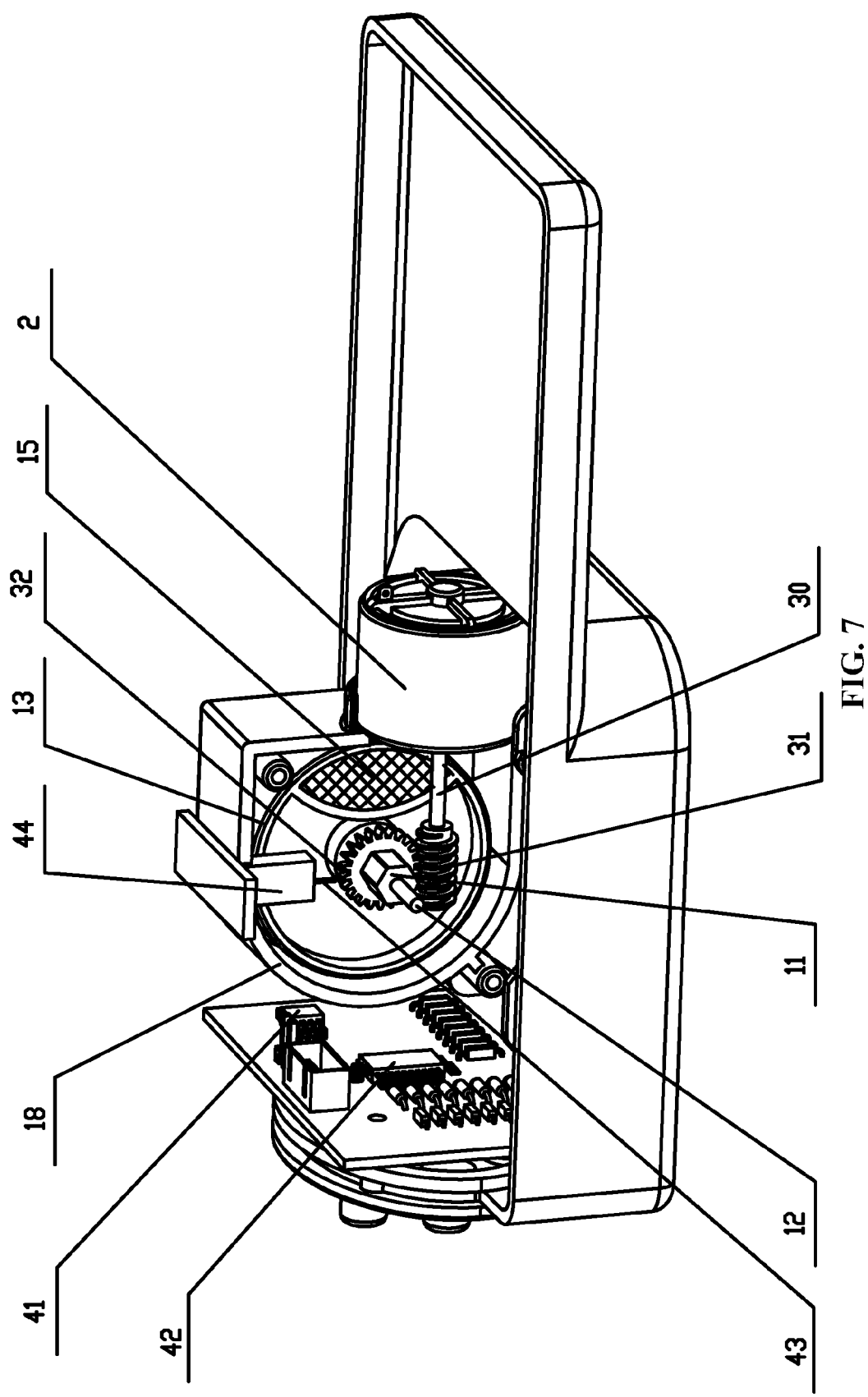
FIG. 7 is an installation diagram of a swing drive mechanism in accordance with one embodiment of the invention.
Figure 8:
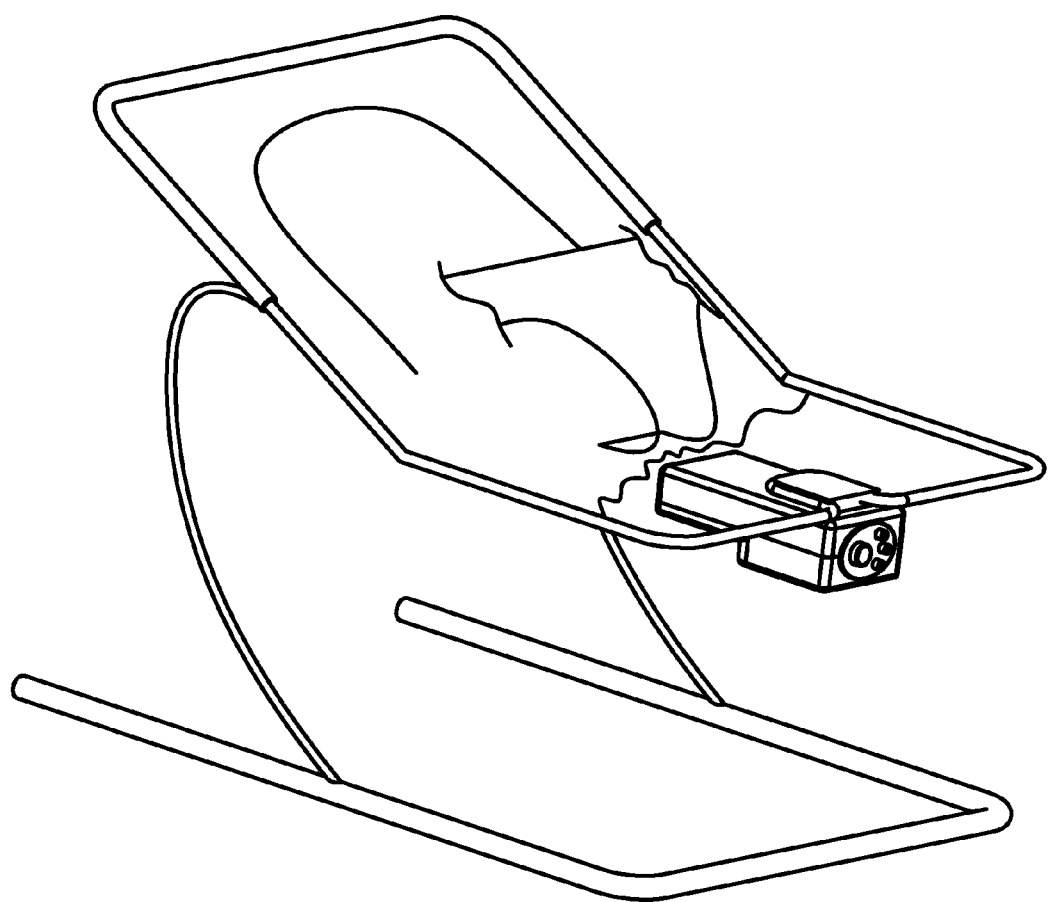
FIG. 8 is a second diagram in use of a swing drive mechanism in accordance with one embodiment of the invention.
Figure 9:
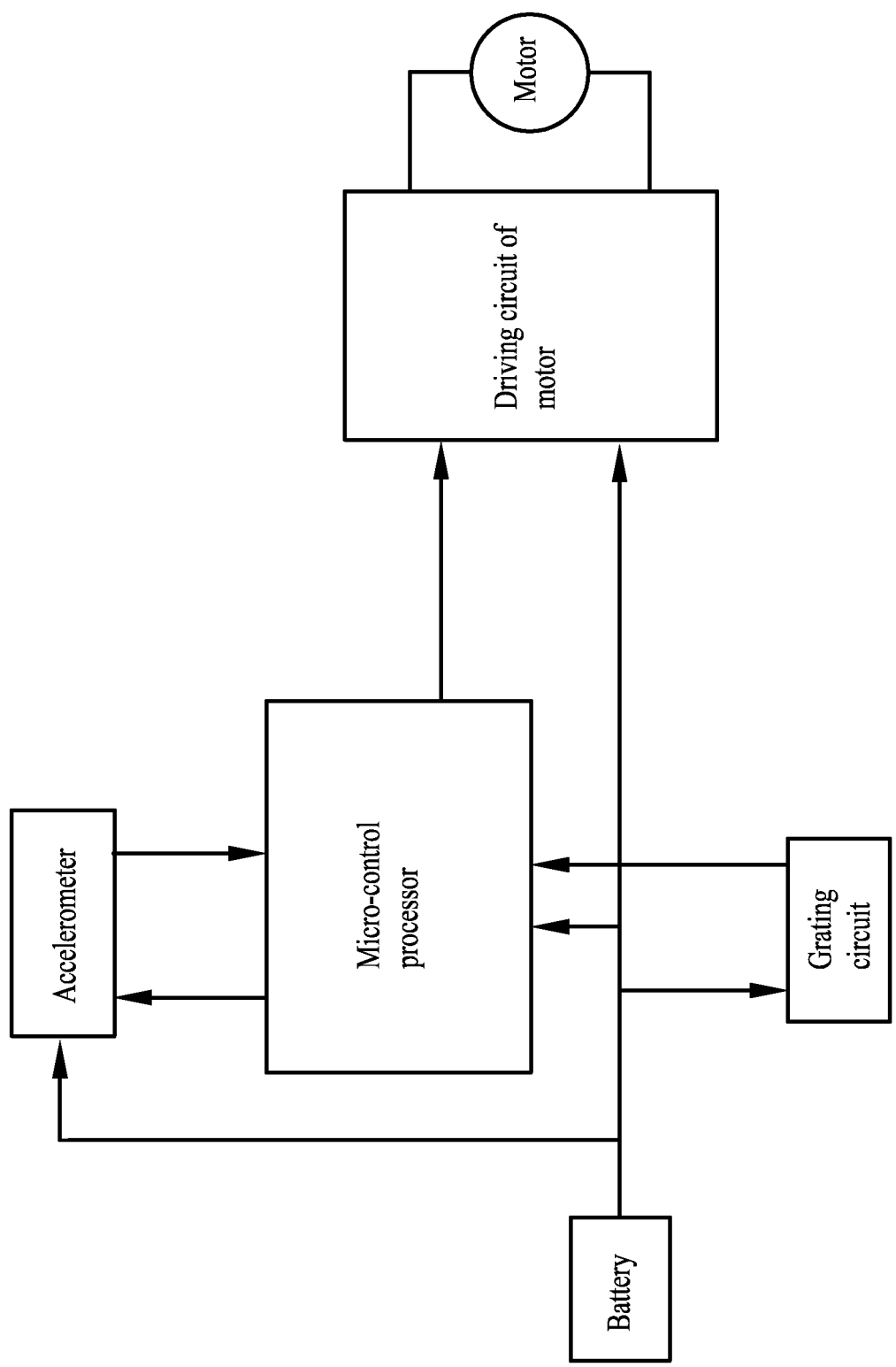
FIG. 9 is a circuit block diagram of a swing drive mechanism in accordance with one embodiment of the invention.

As shown in FIGS. 6 and 8, the electrical cradle 5 is a baby cradle. The swing drive mechanism of the invention is disposed in a box 6. The box 6 is provided with a fixing device 61. The baby cradle comprises a pendulum 51 provided with a mount 52. The pendulum 51 and the mount 52 match with each other and make the box 6 fixed on the pendulum 51.

As shown in FIGS. 2, 7, and 9-11, in use, when the battery is connected, the current initiates the motor 2 that in turn drives the driving shaft 30. Through the deceleration of the worm 31 and the worm gear of the driving medium 32, the turnplate 13 rotates along with the hollow rotating shaft 11. The accelerometer 41 begins to detect and record acceleration readings of the pendulum 51. A centrifugal force is produced by the eccentric heavy block 15 during the rotation of the turnplate 13. As two forces of the eccentric heavy block 15 that are in parallel with the ground surface does not work due to the limitation of the structure of the cradle 5, thus, the eccentric heavy block 15 only produces centrifugal force in two directions of upward and downward. When the eccentric heavy block 15 rotates to a position that the center of the gravity and the hollow rotating shaft 11 are in the same horizontal plane, a component force in a vertical direction of the centrifugal force of the eccentric heavy block 15 is very small, and the force applied on the pendulum 51 is also very small. At such a moment, the acceleration of the pendulum 51 is dependent on the superposition of the gravity of the infant and the elasticity of the swing arm of the cradle. Because the gravity of the infant is constant, the acceleration detected by the accelerometer 41 indicates the degree of deformation of the elastic support of the pendulum 51. Thus, a vibration phase curve of the pendulum 51 can be depicted through analyses of the readings from the accelerometer 41.

Figure 10:
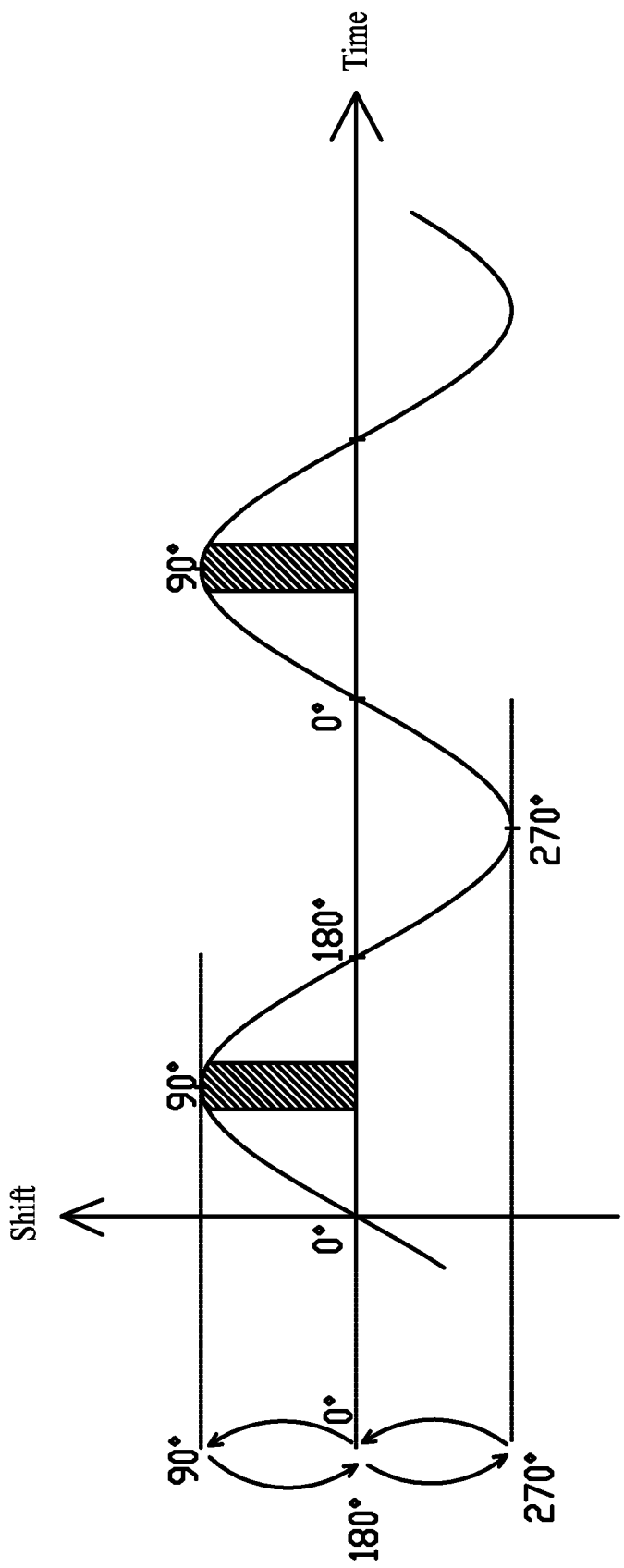
FIG. 10 is a phase diagram of a swing drive mechanism in accordance with one embodiment of the invention.
Figure 11:
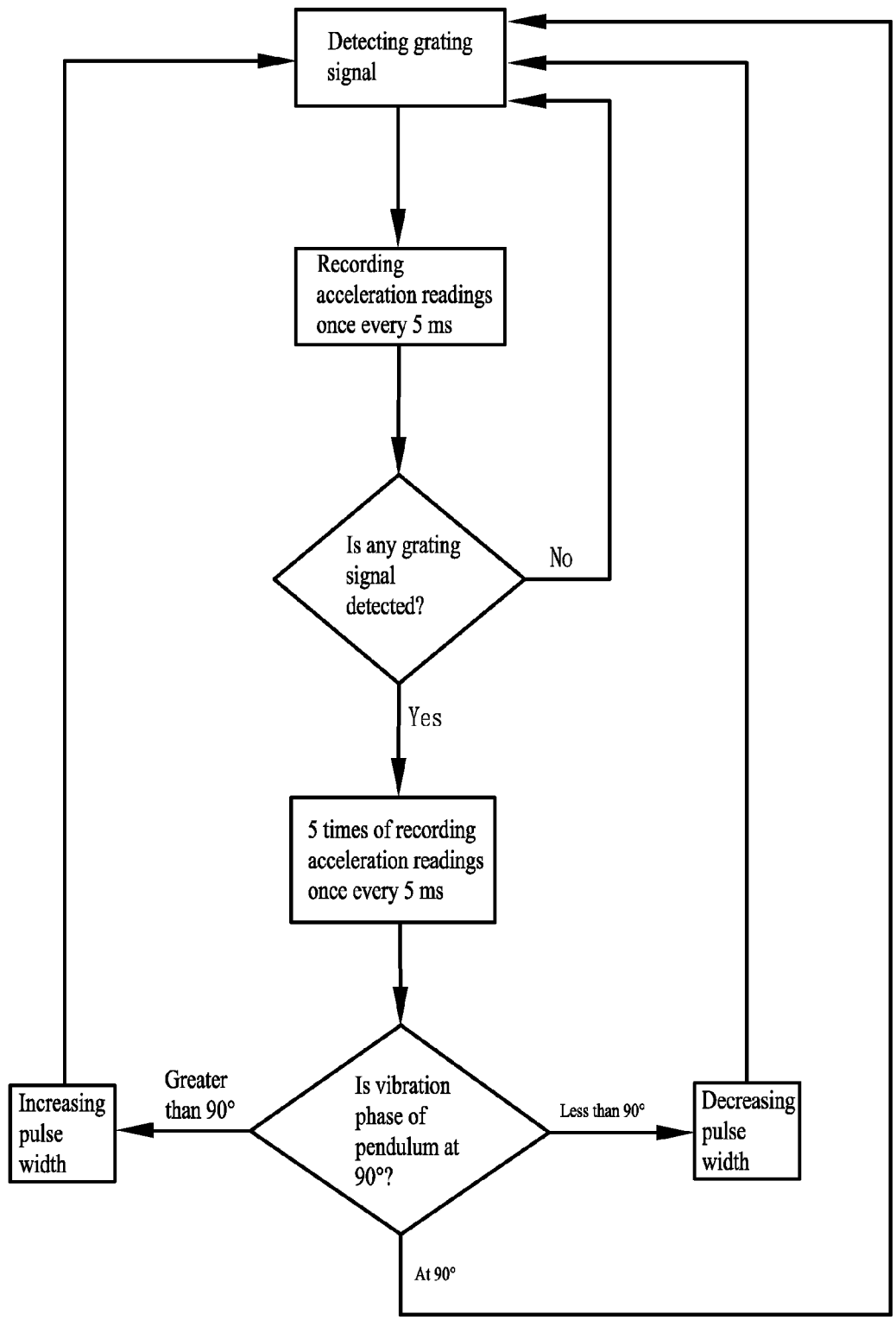
FIG. 11 is a software flow chart of a swing drive mechanism in accordance with one embodiment of the invention.

The accelerometer 41 of the invention is preset to record the readings once every 5 ms. The readings before and after the photocoupler 44 detects the grating 43 are recorded for N times (in the invention, N is set as 5). Thereafter, the acceleration readings are analyzed and the vibration phase of the pendulum 51 can be judged, as shown in FIG. 10. When the grating 43 is detected and the vibration phase of the pendulum 51 is at an angle of 90°, that is, the shaded area, the centrifugal force of the eccentric heavy block 15 has the highest efficiency to drive the pendulum 51. When the grating 43 is detected by the photocoupler 44 and the vibration phase of the pendulum is less or greater than 90°, that is, areas beside the shaded area, the micro-control processor 42 adjusts the pulse width of the motor 2 correspondingly to make the motor decelerate or accelerate the rotation speed, until the vibration phase of the pendulum 51 is at the angle of 90° when the grating 43 is detected by the photocoupler 44. Thus, the swing drive mechanism can swing stably and an energy-saving state is achieved.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A swing drive mechanism, comprising:
a) a vibrating mechanism (1);
b) a motor (2) driving the vibrating mechanism (1); and
c) a transmission mechanism (3);
wherein:
the transmission mechanism (3) is connected between the vibrating mechanism (1) and the motor (2);
the vibrating mechanism (1) is provided with a grating (43) and a photocoupler (44) that detect a position of the vibrating mechanism (1);
the photocoupler (44) is in electric connection with a micro-control processor (42);
the micro-control processor (42) controls the photocoupler (44) to detect the grating (43) and adjust a rotation speed of the motor (2); and
the micro-control processor (42) is in electric connection with an accelerometer (41).

2. The swing drive mechanism of claim 1, wherein the vibrating mechanism (1) comprises a shell body (18) comprising a cavity (181), and the shell body (18) is connected with the pendulum (51);
the cavity (181) comprises a central axis (12) which is sleeved with a hollow rotating shaft (11) rotating around the central axis (12);
two ends of the hollow rotating shaft (11) are connected with turnplates (13) rotating with the hollow rotating shaft (11), respectively;
each turnplate (13) is provided with an eccentric cavity (16) comprising an eccentric heavy block (15); and
the hollow rotating shaft (11) is provided with a driving medium (32) connected with the transmission mechanism (3) and driving the hollow rotating shaft (11).

3. The swing drive mechanism of claim 2, wherein
the transmission mechanism (3) comprises a driving shaft (30) connected with a motor shaft of the motor (2);
the driving medium (32) is a worm gear;
the worm gear and the hollow rotating shaft (11) are integrated as a whole; and
the driving shaft (30) is provided with a worm (31) matching with the worm gear.

4. The swing drive mechanism of claim 2, wherein
the shell body (18) comprises a left shell body (182) and a right shell body (183);
a motor cavity (184) for accommodating the motor (2) is arranged in a lower part of the shell body (18); and
the shell body (18) is provided with a locating slot (10) used to fix the photocoupler (44).

5. The swing drive mechanism of claim 4, wherein the locating slot (10) comprises a groove (101) disposed on the left shell body (182) and a U-shaped slot (102) disposed on the right shell body (183); and a channel (103) is disposed on the U-shaped slot (102).

6. The swing drive mechanism of claim 2, wherein the hollow rotating shaft (11) is a hexagonal shaft, and the turnplate (13) comprises a hexagonal opening (14) in the center matching with the hexagonal shaft.

7. The swing drive mechanism of claim 2, wherein the hollow rotating shaft (11) is a square shaft, and the turnplate (13) comprises a square opening (14) in the center matching with the square shaft.

8. The swing drive mechanism of claim 2, wherein the grating (43) is arranged on the turnplate (13), and the grating (43) crosses the photocoupler (44) when the center of gravity of the eccentric heavy block (15) and the hollow rotating shaft (11) fall on a same horizontal plane.

9. The swing drive mechanism of claim 1, wherein the vibrating mechanism (1) is disposed on a pendulum (51) of an electrical cradle (5), and the accelerometer (41) detects an acceleration of the pendulum (51).

\* \* \* \* \*